(12) United States Patent
Ansai et al.

(10) Patent No.: US 10,833,350 B2
(45) Date of Patent: Nov. 10, 2020

(54) PRESSURE SENSITIVE ADHESIVE COMPOSITION, PRESSURE SENSITIVE ADHESIVE SHEET FOR BATTERIES, AND LITHIUM-ION BATTERY

(71) Applicant: LINTEC CORPORATION, Tokyo (JP)

(72) Inventors: Takeshi Ansai, Tokyo (JP); Yuichi Kurata, Tokyo (JP); Kousuke Takada, Tokyo (JP); Tetsuya Arazoe, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 134 days.

(21) Appl. No.: 15/831,442

(22) Filed: Dec. 5, 2017

(65) Prior Publication Data

US 2018/0159167 A1 Jun. 7, 2018

(30) Foreign Application Priority Data

Dec. 7, 2016 (JP) ................................. 2016-237875

(51) Int. Cl.
| | |
|---|---|
| *H01M 10/04* | (2006.01) |
| *C09J 7/25* | (2018.01) |
| *C09J 7/38* | (2018.01) |
| *H01M 2/02* | (2006.01) |
| *H01M 10/0525* | (2010.01) |
| *C09J 7/22* | (2018.01) |

(52) U.S. Cl.
CPC ............. *H01M 10/049* (2013.01); *C09J 7/22* (2018.01); *C09J 7/25* (2018.01); *C09J 7/385* (2018.01);
(Continued)

(58) Field of Classification Search
None
See application file for complete search history.

(56) References Cited

U.S. PATENT DOCUMENTS

| 9,755,207 B2 | 9/2017 | Kawabe et al. |
| 2011/0159344 A1 | 6/2011 | Kobayashi et al. |
| (Continued) | | |

FOREIGN PATENT DOCUMENTS

| JP | H10-012277 A | 1/1998 |
| JP | H11-102722 A | 4/1999 |
| (Continued) | | |

OTHER PUBLICATIONS

Office Action dated Feb. 13, 2018 issued in corresponding JP patent application No. 2016-237875.
(Continued)

*Primary Examiner* — Tracy M Dove
(74) *Attorney, Agent, or Firm* — Posz Law Group, PLC

(57) ABSTRACT

[Problems] An object is to provide a pressure sensitive adhesive composition, a pressure sensitive adhesive sheet for batteries, and a lithium-ion battery in which good adhesive strength is exhibited to an adherend and the pressure sensitive adhesive is less likely to dissolve into an electrolyte solution even when the pressure sensitive adhesive sheet is in contact with the electrolyte solution.

[Solution] A battery (2) comprising a pressure sensitive adhesive sheet (1), wherein: the pressure sensitive adhesive sheet is used at a site in the battery at which there is a possibility of contact with an electrolyte solution; the pressure sensitive adhesive sheet comprises a base material (11) and a pressure sensitive adhesive layer (13) laminated at one side of the base material; and the pressure sensitive adhesive layer is formed of a pressure sensitive adhesive composition comprising: a (meth)acrylic ester polymer containing a (meth)acrylic alkyl ester and a monomer as monomer units that constitute the polymer, the (meth)acrylic alkyl ester
(Continued)

having a carbon number of an alkyl group of 6 or more and 20 or less, the monomer having a carboxy group in a molecule.

9 Claims, 2 Drawing Sheets

(52) U.S. Cl.
CPC ..... *H01M 2/0277* (2013.01); *H01M 10/0525* (2013.01); *C09J 2203/33* (2013.01); *C09J 2433/00* (2013.01); *C09J 2433/003* (2013.01); *C09J 2479/086* (2013.01)

(56) References Cited

U.S. PATENT DOCUMENTS

| | | | | |
|---|---|---|---|---|
| 2012/0270036 | A1* | 10/2012 | Kiuchi | C09J 133/066 428/336 |
| 2013/0194221 | A1* | 8/2013 | Takada | B32B 7/02 345/173 |
| 2015/0037639 | A1* | 2/2015 | Takamura | H01M 2/08 429/94 |
| 2018/0134923 | A1* | 5/2018 | Kurata | C09J 201/00 |
| 2018/0155582 | A1* | 6/2018 | Ansai | C09J 7/29 |
| 2018/0159167 | A1* | 6/2018 | Ansai | C09J 7/22 |

FOREIGN PATENT DOCUMENTS

| | | |
|---|---|---|
| JP | 2003-053992 A | 2/2003 |
| JP | 2011-138632 A | 7/2011 |
| JP | 2013-140765 | 7/2013 |
| JP | 2013-222526 | 10/2013 |

OTHER PUBLICATIONS

Office Action dated Sep. 1, 2020 issued in corresponding JP patent application No. 2018-122835 (and English translation).

* cited by examiner

PRESSURE SENSITIVE ADHESIVE COMPOSITION, PRESSURE SENSITIVE ADHESIVE SHEET FOR BATTERIES, AND LITHIUM-ION BATTERY

TECHNICAL FIELD

The present invention relates to a pressure sensitive adhesive sheet for batteries, a pressure sensitive adhesive composition for forming a pressure sensitive adhesive layer of the pressure sensitive adhesive sheet for batteries, and a lithium-ion battery manufactured using them.

BACKGROUND ART

In some batteries, a strip-like laminate is housed therein in a state in which the laminate is wound up. The laminate is formed by laminating a positive electrode, a negative electrode, and a separator located between the positive and negative electrodes. The positive and negative electrodes are connected to respective electrode lead-out tabs of conductors, which electrically connect the positive and negative electrodes respectively to a positive electrode terminal and a negative electrode terminal of the battery.

A pressure sensitive adhesive tape may be used as a stopper for the above wound-up laminate and/or used for fixation of the electrode lead-out tabs to the electrodes. Patent Literature 1 discloses such a pressure sensitive adhesive tape. The pressure sensitive adhesive tape comprises a base material and a pressure sensitive adhesive layer provided on one surface of the base material. Main agents of the pressure sensitive adhesive layer include a rubber, in particular, a butyl rubber.

PRIOR ART LITERATURE

Patent Literature

[Patent Literature 1] JP2011-138632A

SUMMARY OF THE INVENTION

Problems to be Solved by the Invention

A pressure sensitive adhesive tape used inside a battery may be in contact with an electrolyte solution which fills the battery and may also be exposed to heat generated, such as during charge and discharge of the battery. Particularly in recent years, development of compact and high performance batteries has been progressed, and the pressure sensitive adhesive tape used inside the batteries will be exposed to more severe conditions.

To allow batteries to exhibit satisfactory performance, it is required for the pressure sensitive adhesive tape to maintain a high adhesion property with an adherend even when exposed to such severe conditions as described above. It is also required that the pressure sensitive adhesive be less likely to dissolve into the electrolyte solution to negatively affect the battery performance. Unfortunately, the conventional pressure sensitive adhesive tapes may not be able to sufficiently satisfy such requirements.

The present invention has been made in consideration of such actual circumstances and an object of the present invention is to provide a pressure sensitive adhesive composition, a pressure sensitive adhesive sheet for batteries, and a lithium-ion battery in which good adhesive strength is exhibited to an adherend and the pressure sensitive adhesive is less likely to dissolve into an electrolyte solution even when the pressure sensitive adhesive sheet is in contact with the electrolyte solution.

Means for Solving the Problems

To achieve the above object, first, the present invention provides a pressure sensitive adhesive composition for forming a pressure sensitive adhesive layer of a pressure sensitive adhesive sheet for batteries, the pressure sensitive adhesive composition comprising: a (meth)acrylic ester polymer containing a (meth)acrylic alkyl ester and a monomer as monomer units that constitute the polymer, the (meth)acrylic alkyl ester having a carbon number of an alkyl group of 6 or more and 20 or less, the monomer having a carboxy group in a molecule (Invention 1).

In the above invention (Invention 1), the (meth)acrylic ester polymer contains, in particular, a (meth)acrylic alkyl ester having a carbon number of an alkyl group of 6 or more and 20 or less as a monomer unit that constitutes the polymer, thereby to exhibit a good pressure sensitive adhesive property and excellent electrolyte solution resistance due to the hydrophobic property. When a pressure sensitive adhesive layer of a pressure sensitive adhesive sheet for batteries is formed using the pressure sensitive adhesive composition according to the above invention (Invention 1), therefore, cohesive failure of the pressure sensitive adhesive layer due to its swelling is suppressed, excellent adhesive strength to an adherend is exhibited, and the pressure sensitive adhesive is less likely to dissolve into an electrolyte solution even in a case in which the pressure sensitive adhesive sheet for batteries is in contact with the electrolyte solution.

In the above invention (Invention 1), the (meth)acrylic ester polymer may preferably contain a monomer having an alicyclic structure in a molecule as a monomer unit that constitutes the polymer (Invention 2).

The pressure sensitive adhesive composition according to the above invention (Invention 1, 2) may preferably further comprise a metal chelate-based crosslinker (Invention 3).

Second, the present invention provides a pressure sensitive adhesive sheet for batteries, comprising: a base material; and a pressure sensitive adhesive layer laminated at one side of the base material, the pressure sensitive adhesive layer being formed of the above pressure sensitive adhesive composition (Invention 1 to 3) (Invention 4). As used in the present description, the term "sheet" encompasses the concept of a tape.

In the above invention (Invention 4), after a pressure sensitive adhesive that constitutes the pressure sensitive adhesive layer is immersed in a solvent of a nonaqueous electrolyte solution at 80° C. for 72 hours, the pressure sensitive adhesive may preferably have a gel fraction of 70% or more and 100% or less (Invention 5).

In the above invention (Invention 4, 5), the base material may preferably be a film formed of a polymer having a nitrogen-containing ring structure at a main chain (Invention 6).

In the above invention (Invention 4 to 6), a surface of the base material at the pressure sensitive adhesive layer side may preferably be formed with a hard coat layer (Invention 7). As used in the present description, the hard coat layer refers to a layer that is formed of a harder material than the base material, and does not mean a layer that exists as the outermost layer of a film.

Third, the present invention provides a lithium-ion battery wherein two or more conductors are fixed in a state in which the two or more conductors are in contact with each other in the battery using the above pressure sensitive adhesive sheet for batteries (Invention 4 to 7) (Invention 8).

Fourth, the present invention provides a battery comprising a pressure sensitive adhesive sheet, wherein: the pressure sensitive adhesive sheet is used at a site in the battery at which there is a possibility of contact with an electrolyte solution; the pressure sensitive adhesive sheet comprises a base material and a pressure sensitive adhesive layer laminated at one side of the base material; and the pressure sensitive adhesive layer is formed of a pressure sensitive adhesive composition comprising: a (meth)acrylic ester polymer containing a (meth)acrylic alkyl ester and a monomer as monomer units that constitute the polymer, the (meth)acrylic alkyl ester having a carbon number of an alkyl group of 6 or more and 20 or less, the monomer having a carboxy group in a molecule.

Fifth, the present invention provides A method of manufacturing a battery, comprising: preparing a pressure sensitive adhesive sheet comprising a base material and a pressure sensitive adhesive layer laminated at one side of the base material; and fixing two or more conductors in a state in which the two or more conductors are in contact with each other in the battery using the pressure sensitive adhesive sheet, wherein the pressure sensitive adhesive layer is formed of a pressure sensitive adhesive composition comprising: a (meth)acrylic ester polymer containing a (meth)acrylic alkyl ester and a monomer as monomer units that constitute the polymer, the (meth)acrylic alkyl ester having a carbon number of an alkyl group of 6 or more and 20 or less, the monomer having a carboxy group in a molecule.

Advantageous Effect of the Invention

According to the pressure sensitive adhesive composition, the pressure sensitive adhesive sheet for batteries, and the lithium-ion battery of the present invention, even when the pressure sensitive adhesive sheet for batteries is in contact with an electrolyte solution, cohesive failure of the pressure sensitive adhesive layer due to its swelling is suppressed, the pressure sensitive adhesive sheet for batteries exhibits excellent adhesive strength to an adherend, and the pressure sensitive adhesive is less likely to dissolve into the electrolyte solution

EMBODIMENTS FOR CARRYING OUT THE INVENTION

Figure 1:
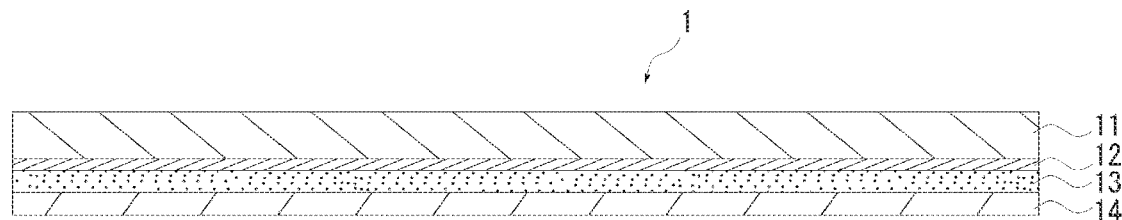
FIG. 1 is a cross-sectional view of a pressure sensitive adhesive sheet for batteries according to an embodiment of the present invention.

Hereinafter, embodiments of the present invention will be described.

<Pressure Sensitive Adhesive Composition>

The pressure sensitive adhesive composition according to an embodiment of the present invention is a pressure sensitive adhesive composition for forming a pressure sensitive adhesive layer of a pressure sensitive adhesive sheet for batteries. The "pressure sensitive adhesive sheet for batteries" in the present description is a pressure sensitive adhesive sheet used at a site at which there is a possibility of contact with an electrolyte solution when manufacturing a battery, may preferably be a pressure sensitive adhesive sheet used inside a battery, and may also be a pressure sensitive adhesive sheet for battery interior. The battery may preferably be a nonaqueous battery. Accordingly, the electrolyte solution used in the battery may preferably be a nonaqueous electrolyte solution. The pressure sensitive adhesive sheet for batteries in the present description may preferably be a pressure sensitive adhesive sheet that is attached to a site at which there is a possibility of immersion in an electrolyte solution inside a nonaqueous battery or a site at which there is a possibility of contact with an electrolyte solution. A lithium-ion battery may be particularly preferred as the nonaqueous battery.

The pressure sensitive adhesive composition according to the present embodiment (which may be referred to as a "pressure sensitive adhesive composition P," hereinafter) contains a (meth)acrylic ester polymer (A) and may preferably further contain a metal chelate-based crosslinker (B) and particularly preferably further contain a silane coupling agent (C). The (meth)acrylic ester polymer (A) contains a (meth)acrylic alkyl ester having a carbon number of an alkyl group of 6 or more and 20 or less and a monomer having a carboxy group in the molecule (carboxy group-containing monomer) as monomer units that constitute the polymer. As used in the present description, the (meth)acrylic ester refers to both an acrylic ester and a methacrylic ester. The same applies to other similar terms. The term "polymer" encompasses the concept of a "copolymer."

(1) Components (1-1) (Meth)Acrylic Ester Polymer (A)

The (meth)acrylic ester polymer (A) contains a (meth)acrylic alkyl ester having a carbon number of an alkyl group of 6 to 20 and a monomer having a carboxy group in the molecule (carboxy group-containing monomer) as monomer units that constitute the polymer.

The above (meth)acrylic alkyl ester having a carbon number of an alkyl group of 6 to 20 allows the obtained pressure sensitive adhesive to exhibit a good pressure sensitive adhesive property and exhibits a hydrophobic property due to the large carbon number of the alkyl group. The hydrophobic property refers to a property that the affinity to an electrolyte solution (including nonaqueous electrolyte solution) is low. As such, the obtained pressure sensitive adhesive exhibits good adhesive strength and is excellent in the electrolyte solution resistance due to the above hydrophobic property. When a pressure sensitive adhesive layer of a pressure sensitive adhesive sheet for batteries is formed using the pressure sensitive adhesive composition P which contains the (meth)acrylic ester polymer (A), therefore, cohesive failure of the pressure sensitive adhesive layer due to its swelling is suppressed and the pressure sensitive adhesive sheet for batteries exhibits excellent adhesive strength to an adherend even in a case in which the pressure sensitive adhesive sheet for batteries is in contact with an electrolyte solution (including a case of immersion). Moreover, the pressure sensitive adhesive which constitutes the pressure sensitive adhesive layer is less likely to dissolve into an electrolyte solution and the pressure sensitive adhesive does not negatively affect the battery performance. These can suppress the erroneous operation, thermal runaway, and short circuit of the battery due to the pressure sensitive adhesive sheet for batteries.

In the (meth)acrylic alkyl ester having a carbon number of an alkyl group of 6 to 20, the alkyl group may be in the form of a linear chain or may also be in the form of a branched chain. From the viewpoint of the hydrophobic property, the carbon number of the alkyl group has to be 6 or more and may be preferably 7 or more and particularly preferably 8 or more. From the viewpoint of the pressure sensitive adhesive property, the carbon number of the alkyl group has to be 20 or less and may be preferably 18 or less, particularly preferably 15 or less and further preferably 10 or less.

Examples of the (meth)acrylic alkyl ester having a carbon number of an alkyl group of 6 to 20 include n-hexyl (meth)acrylate, 2-ethylhexyl (meth)acrylate, isooctyl (meth)acrylate, n-decyl (meth)acrylate, n-dodecyl (meth)acrylate, myristyl (meth)acrylate, palmityl (meth)acrylate, and stearyl (meth)acrylate. Among the above (meth)acrylic alkyl esters, 2-ethylhexyl (meth)acrylate, isooctyl (meth)acrylate, n-decyl (meth)acrylate, n-dodecyl acrylate, etc. may be preferred and 2-ethylhexyl (meth)acrylate and isooctyl (meth)acrylate may be particularly preferred from the viewpoints of the pressure sensitive adhesive property and the hydrophobic property. These may each be used alone and two or more types may also be used in combination.

The (meth)acrylic ester polymer (A) may preferably contain 50 mass % or more, more preferably contain 60 mass % or more, particularly preferably contain 70 mass % or more, and further preferably contain 75 mass % or more of the (meth)acrylic alkyl ester having a carbon number of an alkyl group of 6 to 20 as a monomer unit that constitutes the polymer. When the above (meth)acrylic alkyl ester is contained at 50 mass % or more, the (meth)acrylic ester polymer (A) can exhibit a more excellent pressure sensitive adhesive property and electrolyte solution resistance. From another aspect, the (meth)acrylic ester polymer (A) may preferably contain 99 mass % or less, more preferably contain 97 mass % or less, particularly preferably contain 90 mass % or less, and further preferably 85 mass % or less of the (meth)acrylic alkyl ester having a carbon number of an alkyl group of 6 to 20 as a monomer unit that constitutes the polymer. When the content of the above (meth)acrylic alkyl ester is 99 mass % or less, an appropriate amount of other monomer components can be introduced into the (meth)acrylic ester polymer (A).

The carboxy group-containing monomer, which the (meth)acrylic ester polymer (A) contains as a monomer unit that constitutes the polymer, has an effect of improving the adhesive strength of the obtained pressure sensitive adhesive. When the pressure sensitive adhesive composition P contains the metal chelate-based crosslinker (B), which will be described later, carboxy groups originated from the above carboxy group-containing monomer react with the metal chelate-based crosslinker (B) during the crosslinking of the (meth)acrylic ester polymer (A), thereby to form a crosslinked structure that is a three-dimensional network structure. The pressure sensitive adhesive having the crosslinked structure due to the reaction between the carboxy groups and the metal chelate-based crosslinker (B) is highly resistant to an electrolyte solution, in particular to a nonaqueous electrolyte solution, and is less likely to dissolve into the electrolyte solution even in contact therewith. The obtained pressure sensitive adhesive is therefore further less likely to dissolve into an electrolyte solution in cooperation with the electrolyte solution resistance due to the above (meth)acrylic alkyl ester having a carbon number of an alkyl group of 6 to 20.

Examples of the carboxy group-containing monomer include ethylenically unsaturated carboxylic acids such as acrylic acid, methacrylic acid, crotonic acid, maleic acid, itaconic acid, and citraconic acid. Among these, acrylic acid may be preferred. According to the acrylic acid, the above effects may be more excellent. The above carboxy group-containing monomers may each be used alone and two or more types may also be used in combination.

The (meth)acrylic ester polymer (A) may preferably contain 0.5 mass % or more, particularly preferably contain 1 mass % or more, and further preferably contain 3 mass % or more as the lower limit of the carboxy group-containing monomer, as a monomer unit that constitutes the polymer. From another aspect, the (meth)acrylic ester polymer (A) may preferably contain 30 mass % or less, particularly preferably contain 20 mass % or less, and further preferably contain 10 mass % or less as the upper limit of the carboxy group-containing monomer, as a monomer unit that constitutes the polymer. When the (meth)acrylic ester polymer (A) contains the above amount of the carboxy group-containing monomer as a monomer unit, the above effects may be more excellent in the obtained pressure sensitive adhesive.

The (meth)acrylic ester polymer (A) may preferably contain a monomer having an alicyclic structure in the molecule (alicyclic structure-containing monomer), as a monomer unit that constitutes the polymer. The alicyclic structure-containing monomer exhibits a hydrophobic property due to its bulkiness. The obtained pressure sensitive adhesive is therefore more excellent in the electrolyte solution resistance in cooperation with the hydrophobic property due to the above (meth)acrylic alkyl ester having a carbon number of an alkyl group of 6 to 20. Thus, even when the pressure sensitive adhesive sheet for batteries is in contact with an electrolyte solution, cohesive failure of the pressure sensitive adhesive layer due to its swelling is more effectively suppressed and the pressure sensitive adhesive sheet for batteries exhibits more excellent adhesive strength to an adherend. Moreover, the pressure sensitive adhesive which constitutes the pressure sensitive adhesive layer is further less likely to dissolve into the electrolyte solution.

The carbon ring of the alicyclic structure in the alicyclic structure-containing monomer may have a saturated structure or may also have an unsaturated bond as a part. The alicyclic structure may be a monocyclic alicyclic structure or may also be a polycyclic alicyclic structure, such as bicyclic and tricyclic structures. From the viewpoints of the above hydrophobic property and the electrolyte solution resistance obtained thereby, the above alicyclic structure may preferably be a polycyclic alicyclic structure (polycyclic structure). In consideration of compatibility between the (meth)acrylic ester polymer (A) and other components, the above polycyclic structure may particularly preferably be bicyclic to tetracyclic. From the viewpoint of effectively exhibiting the electrolyte solution resistance, the carbon number of the alicyclic structure (the number of carbon atoms in a portion that forms the ring, and when a plurality of rings is independently present, the total carbon number) may be preferably 5 or more in general and particularly preferably 7 or more. The upper limit of the carbon number of the alicyclic structure is not particularly limited, but may be preferably 15 or less and particularly preferably 10 or less from the viewpoint of compatibility as in the above.

Examples of the alicyclic structure include those including a cyclohexyl skeleton, dicyclopentadiene skeleton, adamantane skeleton, isobornyl skeleton, cycloalkane skeleton (such as cycloheptane skeleton, cyclooctane skeleton, cyclononane skeleton, cyclodecane skeleton, cycloundecane skeleton, and cyclododecane skeleton), cycloalkene skeleton (such as cycloheptene skeleton and cyclooctene skeleton), norbornene skeleton, norbornadiene skeleton, cubane skeleton, basketane skeleton, housane skeleton, spiro skeleton, etc., among which those including a dicyclopentadiene skeleton (carbon number of alicyclic structure: 10), adamantane skeleton (carbon number of alicyclic structure: 10), or isobornyl skeleton (carbon number of alicyclic structure: 7) may be preferred because they exhibit more excellent durability. In particular, those including an isobornyl skeleton may be preferred.

A (meth)acrylic ester monomer including the above skeleton may be preferred as the above alicyclic structure-containing monomer. Specific examples include cyclohexyl (meth)acrylate, dicyclopentanyl (meth)acrylate, adamantyl (meth)acrylate, isobornyl (meth)acrylate, dicyclopentenyl (meth)acrylate, and dicyclopentenyloxyethyl (meth)acrylate, among which dicyclopentanyl (meth)acrylate, adamantyl (meth)acrylate, or isobornyl (meth) acrylate may be preferred because they exhibit more excellent durability. In particular, isobornyl (meth)acrylate may be preferred. One type thereof may be used alone and two or more types may also be used in combination.

When the (meth)acrylic ester polymer (A) contains a alicyclic structure-containing monomer as a monomer that constitutes the polymer, the (meth)acrylic ester polymer (A) may preferably contain 5 mass % or more, particularly preferably contain 7.5 mass % or more, and further preferably contain 10 mass % or more of the alicyclic structure-containing monomer from the viewpoint of further enhancing the hydrophobic property. From the viewpoint of preventing deterioration of the electrolyte solution resistance due to an insufficient amount of the (meth)acrylic alkyl ester having a carbon number of an alkyl group of 6 to 20, the (meth)acrylic ester polymer (A) may preferably contain 35 mass % or less, particularly preferably contain 30 mass % or less, and further preferably contain 20 mass % or less of the alicyclic structure-containing monomer as a monomer unit that constitutes the polymer. When the content of the alicyclic structure-containing monomer falls within the above range, the above electrolyte solution resistance is more excellent.

If desired, the (meth)acrylic ester polymer (A) may contain other monomers as monomer units that constitute the polymer. Examples of the other monomers include a monomer that contains a reactive functional group (excluding a carboxy group) and a monomer that does not contain a reactive functional group.

Examples of the monomer which contains a reactive functional group include a monomer having a hydroxyl group in the molecule (hydroxyl group-containing monomer) and a monomer having an amino group in the molecule (amino group-containing monomer).

Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth) acrylate. These may each be used alone and two or more types may also be used in combination.

Examples of the amino group-containing monomer include aminoethyl (meth)acrylate and n-butylaminoethyl (meth)acrylate. These may each be used alone and two or more types may also be used in combination.

In order not to inhibit the effects obtained by the cross-linked structure due to the reaction between the carboxy groups and the metal chelate-based crosslinker (B), it may be preferred to use only the previously-described carboxy group-containing monomer as the monomer which contains a reactive functional group.

Examples of the monomer which does not contain a reactive functional group include (meth)acrylic alkyl esters having a carbon number of an alkyl group of 1 to 4, such as methyl (meth)acrylate, ethyl (meth)acrylate, propyl (meth) acrylate and butyl (meth)acrylate, alkoxyalkyl (meth)acrylates such as methoxyethyl (meth)acrylate and ethoxyethyl (meth)acrylate, (meth)acrylic esters having a non-crosslinkable tertiary amino group, such as N,N-dimethylaminoethyl (meth)acrylate, N,N-dimethylaminopropyl (meth)acrylate and (meth)acryloyl morpholine, (meth)acrylamide, dimethyl acrylamide, vinyl acetate, and styrene. These may each be used alone and two or more types may also be used in combination.

The polymerization form of the (meth)acrylic ester polymer (A) may be a random copolymer and may also be a block copolymer.

The weight-average molecular weight of the (meth) acrylic ester polymer (A) may be preferably 50,000 or more, more preferably 100,000 or more, particularly preferably 200,000 or more, and further preferably 500,000 or more as the lower limit. When the lower limit of the weight-average molecular weight of the (meth)acrylic ester polymer (A) satisfies the above, the obtained pressure sensitive adhesive can have more excellent resistance to dissolution into an electrolyte solution.

From another aspect, the weight-average molecular weight of the (meth)acrylic ester polymer (A) may be preferably 2,500,000 or less, more preferably 2,000,000 or less, particularly preferably 1,500,000 or less, and further preferably 1,200,000 or less as the upper limit. When the upper limit of the weight-average molecular weight of the (meth)acrylic ester polymer (A) satisfies the above, the obtained pressure sensitive adhesive can have more excellent adhesive strength. As used in the present description, the weight-average molecular weight refers to a standard polystyrene equivalent value that is measured using a gel permeation chromatography (GPC) method.

The glass-transition temperature (Tg) of the (meth)acrylic ester polymer (A) may be preferably lower than 20° C., particularly preferably lower than 0° C., and further preferably lower than −40° C. as the upper limit. When the upper limit of the glass-transition temperature of the (meth)acrylic ester polymer (A) satisfies the above, the pressure sensitive adhesive can have high tack in an ordinary temperature and is less likely to delaminate when immersed in a electrolyte solution. The lower limit of the glass-transition temperature (Tg) of the (meth)acrylic ester polymer (A) is not particularly limited, but from the viewpoint of improving the durability in an electrolyte solution, the lower limit may be preferably −70° C. or higher in general, particularly preferably −62.5° C. or higher, and further preferably −55° C. or higher. Here, the glass-transition temperature (Tg) of the (meth)acrylic ester polymer (A) is to be calculated using the FOX equation on the basis of the glass-transition temperature (Tg) of a homopolymer of each polymer that constitutes the (meth)acrylic ester polymer (A).

In the pressure sensitive adhesive composition P, one type of the (meth)acrylic ester polymer (A) may be used alone and two or more types may also be used in combination.

(1-2) Metal Chelate-Based Crosslinker (B)

The pressure sensitive adhesive composition P may preferably contain a metal chelate-based crosslinker (B). When the pressure sensitive adhesive composition P contains the metal chelate-based crosslinker (B), a pressure sensitive adhesive can be obtained in which the (meth)acrylic ester polymer (A) is crosslinked by the metal chelate-based crosslinker (B). A pressure sensitive adhesive having this crosslinked structure has high resistance to an electrolyte solution, in particular to a nonaqueous electrolyte solution, and is less likely to dissolve into the electrolyte solution in cooperation with the electrolyte solution resistance due to the above (meth)acrylic alkyl ester having a carbon number of an alkyl of 6 to 20.

Examples of a compound that can be used as the metal chelate-based crosslinker (B) include metal chelate compounds in which the metal atom is aluminum, zirconium, titanium, zinc, iron, tin, or other appropriate metal. Among these, an aluminum chelate compound may be particularly preferred. The aluminum chelate compound particularly effectively exhibits the previously-described resistance to dissolution into an electrolyte solution.

Examples of the aluminum chelate compound include diisopropoxyaluminum monooleylacetoacetate, monoisopropoxyaluminum bisoleylacetoacetate, monoisopropoxyaluminum monooleate monoethylacetoacetate, diisopropoxyaluminum monolaurylacetoacetate, diisopropoxyaluminum monostearylacetoacetate, diisopropoxyaluminum monoisostearylacetoacetate, monoisopropoxyaluminum mono-N-lauroyl-R-alanate monolaurylacetoacetate, aluminum tris(acetylacetonate), monoacetylacetonate aluminum bis(isobutylacetoacetate) chelate, monoacetylacetonate aluminum bis(2-ethylhexylacetoacetate) chelate, monoacetylacetonate aluminum bis(dodecylacetoacetate) chelate, and monoacetylacetonate aluminum bis(oleylacetoacetate) chelate. Among these, the aluminum tris(acetylacetonate) may be preferred from the viewpoint of the above effects. These may each be used alone and two or more types may also be used in combination.

Examples of other metal chelate compounds include titanium tetrapropionate, titanium tetra-n-butyrate, titanium tetra-2-ethylhexanoate, zirconium sec-butyrate, zirconium diethoxy-tert-butyrate, triethanolamine titanium dipropionate, ammonium salt of titanium lactate, and tetraoctyleneglycol titanate. These may each be used alone and two or more types may also be used in combination.

One type of the above metal chelate-based crosslinker (B) may be used alone and two or more types may also be used in combination.

The content of the metal chelate-based crosslinker (B) in the pressure sensitive adhesive composition P according to the present embodiment may be preferably 0.1 mass parts or more, more preferably 0.3 mass parts or more, particularly preferably 0.5 mass parts or more, and further preferably 1.2 mass parts or more as the lower limit to 100 mass parts of the (meth)acrylic ester polymer (A). From another aspect, the content of the metal chelate-based crosslinker (B) may be preferably 5 mass parts or less, particularly preferably 4 mass parts or less, and further preferably 3 mass parts or less as the upper limit. When the content of the metal chelate-based crosslinker (B) falls within the above range, the previously-described effects can be more excellent.

(1-3) Silane Coupling Agent (C)

The pressure sensitive adhesive composition P may preferably further contain a silane coupling agent (C). When the pressure sensitive adhesive composition P contains the silane coupling agent (C), the pressure sensitive adhesive sheet for batteries exhibits excellent pressure sensitive adhesive property to an adherend (in particular, to a metal member) even in a case in which the pressure sensitive adhesive sheet for batteries is in contact with an electrolyte solution (including a case of immersion). This can further improve the adhesive strength and effectively suppress the delamination of the pressure sensitive adhesive sheet for batteries from an adherend because a synergistic action is exhibited with the pressure sensitive adhesive property and electrolyte solution resistance due to the (meth)acrylic alkyl ester having a carbon number of an alkyl of 6 to 20 which constitutes the (meth)acrylic ester polymer (A). As a result, it is possible to suppress deterioration of the battery performance due to the pressure sensitive adhesive sheet for batteries. Moreover, also when the surface of the base material at the pressure sensitive adhesive layer side in the pressure sensitive adhesive sheet for batteries is formed with a hard coat layer, the above pressure sensitive adhesive layer can have a high adhesion property to the hard coat layer. When the pressure sensitive adhesive sheet for batteries is immersed in an electrolyte solvent, therefore, delamination and the like can be prevented from occurring at the interface between the hard coat layer and the pressure sensitive adhesive layer, and the adhesive strength after the immersion in the electrolyte solution can be higher. In addition, when a release sheet is removed from the pressure sensitive adhesive layer, it is possible also to suppress delamination of the pressure sensitive adhesive layer from the hard coat layer due to transfer of the pressure sensitive adhesive layer to the release sheet.

Preferred examples of the silane coupling agent (C) include an organosilicon compound that has at least one alkoxysilyl group in the molecule and is well compatible with the (meth)acrylic ester polymer (A).

Examples of such a silane coupling agent (C) include polymerizable unsaturated group-containing silicon compounds such as vinyltrimethoxysilane, vinyltriethoxysilane and methacryloxypropyltrimethoxysilane, silicon compounds having an epoxy structure, such as 3-glycidoxypropyltrimethoxysilane and 2-(3,4-epoxycyclohexyl)ethyltrimethoxysilane, mercapto group-containing silicon compounds such as 3-mercaptopropyltrimethoxysilane, 3-mercaptopropyltriethoxysilane and 3-mercaptopropyldimethoxymethylsilane, amino group-containing silicon compounds such as 3-aminopropyltrimethoxysilane, N-(2-aminoethyl)-3-aminopropyltrimethoxysilane and N-(2-aminoethyl)-3-aminopropylmethyldimethoxysilane, 3-chloropropyltrimethoxysilane, 3-isocyanatepropyltriethoxysilane, and condensates of at least one of these and an alkyl group-containing silicon compound such as methyltriethoxysilane, ethyltriethoxysilane, methyltrimethoxysilane and ethyltrimethoxysilane. Among these, the silicon compound having an epoxy structure may be preferred and the 3-glycidoxypropyltrimethoxysilane may be particularly preferred from the viewpoint of the above effects. These may each be used alone and two or more types may also be used in combination.

The content of the silane coupling agent (C) in the pressure sensitive adhesive composition P may be preferably 0.01 mass parts or more, more preferably 0.05 mass parts or more, particularly preferably 0.1 mass parts or more, and further preferably 0.4 mass parts or more to 100 mass parts of the (meth)acrylic ester polymer (A). From another aspect, the content may be preferably 5 mass parts or less, more preferably 4 mass parts or less, particularly preferably 3 mass parts or less, and further preferably 1.5 mass parts or less. When the content of the silane coupling agent (C) falls within the above range, the adhesive strength after immersion in an electrolyte solvent can be more excellent.

(1-4) Additives

If desired, the pressure sensitive adhesive composition P may contain various additives, such as a tackifier, antioxidant, softening agent, and filler, which are commonly used in an acrylic-based pressure sensitive adhesive. The additives which constitute the pressure sensitive adhesive composition P are deemed not to include a polymerization solvent and a diluent solvent, which will be described later.

(2) Production of Pressure Sensitive Adhesive Composition

The pressure sensitive adhesive composition P can be produced through producing the (meth)acrylic ester polymer (A) and, if necessary, adding the metal chelate-based crosslinker (B), the silane coupling agent (C), additives, and the like to the obtained (meth)acrylic ester polymer (A).

The (meth)acrylic ester polymer (A) can be produced by polymerizing a mixture of the monomers which constitute the polymer using a commonly-used radical polymerization method. Polymerization of the (meth)acrylic ester polymer (A) can be carried out, such as by a solution polymerization method using a polymerization initiator, if desired. Examples of the polymerization solvent include ethyl acetate, n-butyl acetate, isobutyl acetate, toluene, acetone, hexane, and methyl ethyl ketone and two or more types thereof may also be used in combination.

Examples of the polymerization initiator include azo-based compounds and organic peroxides and two or more types thereof may also be used in combination. Examples of the azo-based compounds include 2,2'-azobisisobutyronitrile, 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), and 2,2'-azobis[2-(2-imidazolin-2-yl)propane].

Examples of the organic peroxide include benzoyl peroxide, t-butyl perbenzoate, cumene hydroperoxide, diisopropyl peroxydicarbonate, di-n-propyl peroxydicarbonate, di(2-ethoxyethyl)peroxydicarbonate, t-butyl peroxyneodecanoate, t-butyl peroxybivalate, (3,5,5-trimethylhexanoyl) peroxide, dipropionyl peroxide, and diacetyl peroxide.

The weight-average molecular weight of the polymer to be obtained can be adjusted by compounding a chain transfer agent, such as 2-mercaptoethanol, in the above polymerization step.

After the (meth)acrylic ester polymer (A) is obtained, the pressure sensitive adhesive composition P may be obtained through adding, if desired, the metal chelate-based crosslinker (B), the silane coupling agent (C), additives and the like to the solution of the (meth)acrylic ester polymer (A) and sufficiently mixing them.

For adjustment of a suitable viscosity for coating and/or adjustment of a desired film thickness of the pressure sensitive adhesive layer, the pressure sensitive adhesive composition P may be appropriately diluted with a diluent solvent or the like in addition to the previously-described polymerization solvent to obtain a coating liquid, which will be described later. Examples of the diluent solvent include ethyl acetate, n-butyl acetate, isobutyl acetate, toluene, acetone, hexane, and methyl ethyl ketone and two or more types thereof may also be used in combination.

<Pressure Sensitive Adhesive Sheet for Batteries>

The pressure sensitive adhesive sheet for batteries according to an embodiment of the present invention comprises a base material and a pressure sensitive adhesive layer laminated at one side of the base material, and the pressure sensitive adhesive layer is formed of the previously-described pressure sensitive adhesive composition P. The pressure sensitive adhesive sheet for batteries according to a preferred embodiment will be described below.

As illustrated in FIG. 1, a pressure sensitive adhesive sheet for batteries 1 according to the present embodiment may be constituted of a base material 11, a hard coat layer 12 provided at one side of the base material 11, a pressure sensitive adhesive layer 13 provided at a side of the hard coat layer 12 opposite to the base material 11, and a release sheet 14 provided at a side of the pressure sensitive adhesive layer 13 opposite to the hard coat layer 12. The pressure sensitive adhesive layer 13 may be formed of the previously-described pressure sensitive adhesive composition P. In the present invention, the hard coat layer 12 and the release sheet 14 are not essential constitutional elements and may be omitted.

In the pressure sensitive adhesive sheet for batteries 1 having the pressure sensitive adhesive layer 13 formed of the previously-described pressure sensitive adhesive composition P, even when the pressure sensitive adhesive sheet for batteries 1 is in contact with an electrolyte solution (this situation includes a case of being immersed in the electrolyte solution), cohesive failure of the pressure sensitive adhesive layer 13 due to its swelling is suppressed according to the good pressure sensitive adhesive property and electrolyte solution resistance of the (meth)acrylic alkyl ester having a carbon number of an alkyl of 6 to 20 which constitutes the (meth)acrylic ester polymer (A), and the pressure sensitive adhesive sheet for batteries 1 exhibits excellent adhesive strength to an adherend. Moreover, the pressure sensitive adhesive which constitutes the pressure sensitive adhesive layer 13 is less likely to dissolve into the electrolyte solution and does not negatively affect the battery performance. These can suppress the erroneous operation, thermal runaway, and short circuit of the battery due to the pressure sensitive adhesive sheet for batteries 1.

Furthermore, the pressure sensitive adhesive sheet for batteries 1 according to the present embodiment is provided with the hard coat layer 12 and the insulation can thereby be ensured to improve the safety of the battery even if the base material 11 and/or the pressure sensitive adhesive layer 13 are carbonized.

1. Base Material

In the pressure sensitive adhesive sheet for batteries 1 according to the present embodiment, the base material 11 may preferably have flame retardancy that satisfies the flame retardancy level V-0 according to the UL 94 standard. Owing to such flame retardancy of the base material 11, denaturation and deformation of the base material 11 can be suppressed even when the battery generates heat due to its ordinary use. Moreover, even if troubles occur in the battery and it generates excessive heat, ignition and/or burning of the base material 11 can be suppressed to prevent a serious accident.

The material of the substrate 11 can be appropriately selected from the viewpoints of flame retardancy, heat resistance, insulation properties, reactivity with an electrolyte solution, permeability to an electrolyte solution, and the like. In particular, it may be preferred to use a resin film as the base material 11. Examples of the resin film include films of polyesters such as polyethylene terephthalate, polybutylene terephthalate and polyethylene naphthalate, polyolefin films such as a polyethylene film and polypropylene film, cellophane, a diacetyl cellulose film, triacetyl cellulose film, acetyl cellulose butyrate film, polyvinyl chloride film, polyvinylidene chloride film, polyvinyl alcohol film, ethylene-vinyl acetate copolymer film, polystyrene film, polycarbonate film, polymethylpentene film, polysulfone film, polyether ether ketone film, polyether sulfone film, polyether imide film, fluorine resin film, polyamide film, polyimide film, polyamideimide film, acrylic resin film, polyurethane resin film, norbornene-based polymer film, cyclic olefin-based polymer film, cyclic conjugated diene-based polymer film, vinyl alicyclic hydrocarbon polymer film, other resin films, and laminated films thereof. In particular, from the viewpoint of exhibiting excellent flame retardancy and heat resistance, films of a polymer that contains nitrogen in its main chain (the film may contain other components than the polymer, here and hereinafter) may be preferred, films of a polymer that has a nitrogen-containing ring structure in the main chain may be particularly preferred, and films of a polymer that has a nitrogen-containing ring structure and an aromatic ring structure in the main chain may be further preferred. Specifically, for example, a polyimide film, polyetherimide film, or polyether ether ketone film may be preferred, among which the polyimide film may be preferred because it exhibits higher heat resistance.

The thickness of the base material 11 may be preferably 5 to 200 μm, particularly preferably 10 to 100 μm, and further preferably 15 to 40 μm. When the thickness of the base material 11 is 5 μm or more, the base material 11 can have moderate rigidity and the occurrence of curl can be effectively suppressed even if curing shrinkage occurs during the formation of the hard coat layer 12 on the base material 11. On the other hand, the thickness of the base material 11 being 200 μm or less allows the pressure sensitive adhesive sheet for batteries 1 to have moderate flexibility and, even when the pressure sensitive adhesive sheet for batteries 1 is attached to a surface having a height difference, such as when an electrode and an electrode lead-out tab are fixed to each other, the pressure sensitive adhesive sheet for batteries 1 can well follow the height difference.

2. Hard Coat Layer (1) Physical Properties of Hard Coat Layer

In the pressure sensitive adhesive sheet for batteries 1 according to the present embodiment, the hard coat layer 12 in a state of being provided on the base material 11 may preferably has a property that, when the hard coat layer 12 is rubbed at a load of 250 g/cm$^2$ using #0000 steel wool to reciprocate it ten times within a length of 10 cm, no scratches occur. When the hard coat layer 12 is evaluated to have such steel wool resistance, permeation of the electrolyte solution through the hard coat layer 12 can be effectively blocked, and the escape of an inorganic filler due to swelling of the hard coat layer 12 can be effectively suppressed.

(2) Composition of Hard Coat Layer

The hard coat layer 12 may preferably be formed of a composition that contains an organic component and an inorganic filler (this composition may be referred to as a "composition for hard coat layer," hereinafter). In particular, the hard coat layer 12 may preferably be made of a material obtained by curing a composition that contains an active energy ray-curable component and an inorganic filler.

(2-1) Active Energy Ray-Curable Component

The active energy ray-curable component is not particularly limited, provided that it can be cured by irradiation with active energy rays to exhibit desired hardness.

Specific examples of the active energy ray-curable component include a polyfunctional (meth)acrylate-based monomer, (meth)acrylate-based prepolymer, and active energy ray-curable polymer, among which the polyfunctional (meth)acrylate-based monomer and/or (meth)acrylate-based prepolymer may be preferred. The polyfunctional (meth) acrylate-based monomer and the (meth)acrylate-based prepolymer may each be used alone and both may also be used in combination. As used in the present description, the (meth)acrylate refers to both an acrylate and a methacrylate. The same applies to other similar terms.

Examples of the polyfunctional (meth)acrylate-based monomer include 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylol propane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, caprolactone-modified dipentaerythritol hexa(meth)acrylate, and other appropriate polyfunctional (meth)acrylates. These may each be used alone and two or more types may also be used in combination. The polyfunctional (meth)acrylate-based monomer is not particularly restricted, but its molecular weight may more preferably be less than 1,000 from the viewpoint of preventing escape of the inorganic filler from the hard coat layer 12 under the immersion in an electrolyte solution.

On the other hand, examples of the (meth)acrylate-based prepolymer include polyester acrylate-based, epoxy acrylate-based, urethane acrylate-based, and polyol acrylate-based prepolymers. One type of prepolymer may be used alone and two or more types may also be used in combination.

The glass-transition point after curing of the active energy ray-curable component which constitutes the hard coat layer 12 of the present embodiment may be preferably 130° C. or higher and more preferably 150° C. or higher, and an active energy ray-curable component of which the glass-transition point is not observed may be particularly preferred. When the glass-transition point of the active energy ray-curable component satisfies the above, the hard coat layer 12 can have excellent heat resistance, and a battery that includes the pressure sensitive adhesive sheet for batteries 1 provided with such a hard coat layer 12 can have excellent performance and safety.

When two or more types of the active energy ray-curable components are used in the hard coat layer 12 of the present embodiment, it may be preferred for them to have excellent compatibility with each other.

(2-2) Inorganic Filler

The composition for hard coat layer which constitutes the hard coat layer 12 of the present embodiment may preferably contain an inorganic filler. When containing an inorganic filler, the hard coat layer 12 of the present embodiment can have rigidity and it is thus possible to prevent breakage, such as tear and puncture, of the pressure sensitive adhesive sheet for batteries 1 due to impact and the like under high temperatures or immersion in an electrolyte solution.

Preferable examples of the inorganic filler include powders of silica, alumina, boehmite, talc, calcium carbonate, titanium oxide, iron oxide, silicon carbide, boron nitride, zirconium oxide and other appropriate materials, spherical beads thereof, single crystal fibers, and glass fibers. These can be used alone and two or more types can also be used in combination. Among these, silica, alumina, boehmite, titanium oxide, zirconium oxide and the like may be preferred, and silica, alumina and zirconium oxide may be preferred from the viewpoint of dispersibility into an active energy ray-curable component. These inorganic fillers can also be used in the form of a sol dispersed in a dispersion medium.

It may also be preferred for the inorganic filler to be surface-modified. A reactive silica can be exemplified as such an inorganic filler.

As used in the present description, the "reactive silica" refers to silica fine particles that are surface-modified with an organic compound having an active energy ray-curable unsaturated group. The above silica fine particles (reactive silica) which are surface-modified with an organic compound having an active energy ray-curable unsaturated group may ordinarily be obtained, for example, by a reaction between silanol groups on the surfaces of silica fine particles having an average particle diameter of 1 to 200 nm and an active energy ray-curable unsaturated group-containing organic compound having reactive functional groups (such as isocyanate groups, epoxy groups, and carboxy groups) that can react with the silanol groups. Preferred examples of the above active energy ray-curable unsaturated group include (meth)acryloyl group and vinyl group.

Available examples of an organic-inorganic hybrid material (organosilica sol) that contains such an reactive silica and the previously-described polyfunctional (meth)acrylate-based monomer and/or (meth)acrylate-based prepolymer include products of the trade name "OPSTAR Z7530," "OPSTAR Z7524," "OPSTAR TU4086," and "OPSTAR Z7537" (all available from JSR Corporation).

Other examples of preferred inorganic fillers include alumina ceramic nanoparticles, a silica sol in which silica fine particles having silanol groups exposed at the silica surface are suspended in a colloidal state in the dispersion medium, and an organosilica sol in which silanol groups on the silica surface are surface-treated with a silane coupling agent or the like.

The average particle diameter of the inorganic filler used in the present embodiment may be preferably 1 to 1,000 nm, particularly preferably 10 to 500 nm, and further preferably 15 to 200 nm. When the average particle diameter of the inorganic filler is 1 nm or more, the hard coat layer 12 obtained by curing the composition for hard coat layer can have higher rigidity. When the average particle diameter of the inorganic filler is 1,000 nm or less, the dispersibility of the inorganic filler in the composition for hard coat layer can be excellent and it is thus possible to effectively prevent the occurrence of irregularities on the surface of the hard coat layer 12 opposite to the base material 11 during the formation of the hard coat layer 12 on the base material 11. Moreover, when the pressure sensitive adhesive layer 13 is formed on that surface, significantly high smoothness can be obtained on the surface of the pressure sensitive adhesive layer 13 opposite to the hard coat layer 12. This allows the pressure sensitive adhesive layer 13 to exhibit an excellent adhesion property to an adherend. The average particle diameter of the inorganic filler is to be measured using a laser diffraction scattering-type particle diameter distribution measuring apparatus.

The content of the inorganic filler in the hard coat layer 12 of the present embodiment may be preferably 0 to 90 mass % (90 mass % or less), more preferably 30 to 85 mass %, particularly preferably 40 to 80 mass %, and further preferably 45 to 70 mass % with respect to the hard coat layer 12. When the inorganic filler is contained, the content being 30 mass % or more allows the hard coat layer 12 to have higher rigidity. The content of the inorganic filler being 90 mass % or less enables easy film formation using the composition for hard coat layer.

(2-3) Other Components

The composition for forming the hard coat layer 12 of the present embodiment may contain various additives in addition to the above-described components. Examples of such additives include a photopolymerization initiator, antioxidant, antistatic, silane coupling agent, antiaging agent, thermal polymerization inhibitor, colorant, surfactant, storage stabilizer, plasticizer, glidant, antifoam, and organic-based filler.

When the hard coat layer 12 is formed using ultraviolet rays as the active energy rays, it is preferred to use a photopolymerization initiator. The photopolymerization initiator is not particularly limited, provided that it functions as a photopolymerization initiator for the active energy ray-curable component to be used. Examples of the photopolymerization initiator include acylphosphine oxide compounds, benzoin compounds, acetophenone compounds, titanocene compounds, thioxanthone compounds, and peroxide compounds. Specific examples include 1-hydroxycyclohexyl phenyl ketone, 2-hydroxy-2-methyl-1-phenyl-propane-1-one, 2,2-dimethoxy-1,2-diphenylethan-1-one, benzoin, benzoin methyl ether, benzoin ethyl ether, benzoin isopropyl ether, benzyl diphenyl sulfide, tetramethyl thiuram monosulfide, azobisisobutyronitrile, dibenzyl, diacetyl, and R-chloroanthraquinone. These may each be used alone and two or more types may also be used in combination.

The content of the above photopolymerization initiator in the composition for hard coat layer may be preferably 0.1 to 20 mass parts in general and particularly preferably 1 to 15 mass parts to 100 mass parts of the active energy ray-curable component.

(3) Thickness of Hard Coat Layer

The thickness of the hard coat layer 12 may be preferably 0.1 to 10 μm, particularly preferably 0.5 to 7 μm, and further preferably 1 to 4 μm. When the thickness of the hard coat layer 12 is 0.1 μm or more, permeation of the electrolyte solution through the hard coat layer 12 can be effectively blocked. On the other hand, the thickness of the hard coat layer 12 being 10 μm or less allows the pressure sensitive adhesive sheet for batteries 1 to have moderate flexibility and, even when the pressure sensitive adhesive sheet for batteries 1 is attached to a surface having a height difference, such as when an electrode and an electrode lead-out tab are fixed to each other, the pressure sensitive adhesive sheet for batteries 1 can well follow the height difference.

3. Pressure Sensitive Adhesive Layer

The pressure sensitive adhesive layer 13 is formed of the previously-described pressure sensitive adhesive composition P. A method of forming the pressure sensitive adhesive layer 13 will be described later.

(1) Physical Properties of Pressure Sensitive Adhesive/Pressure Sensitive Adhesive Layer In the pressure sensitive adhesive sheet for batteries 1 according to the present embodiment, after the pressure sensitive adhesive which constitutes the pressure sensitive adhesive layer 13 is immersed in a solvent of a nonaqueous electrolyte solution at 80° C. for 72 hours, the gel fraction of the pressure sensitive adhesive may be preferably 70% or more, particularly preferably 80% or more, and further preferably 90% or more as the lower limit. The lower limit of the above gel fraction satisfying the above can suppress the amount of dissolution of the pressure sensitive adhesive when the pressure sensitive adhesive layer 13 is in contact with an electrolyte solution. This can more effectively suppress the erroneous operation, thermal runaway, and short circuit of the battery in which the pressure sensitive adhesive sheet for batteries 1 is used.

From another aspect, the upper limit of the above gel fraction may be preferably 100% or less, particularly preferably 99% or less, and further preferably 98% or less. The upper limit of the gel fraction being 98% or less allows the pressure sensitive adhesive sheet for batteries 1 to have moderate flexibility and, even when the pressure sensitive adhesive sheet for batteries 1 is attached to a surface having a height difference, such as when an electrode and an electrode lead-out tab are fixed to each other, the pressure sensitive adhesive sheet for batteries 1 can well follow the height difference.

The solvent of a nonaqueous electrolyte solution as used herein may be a prepared liquid obtained by mixing ethylene carbonate and diethyl carbonate at a volume ratio of 1:1. A method of testing the gel fraction is as described in the exemplary test, which will be described later.

(2) Thickness of Pressure Sensitive Adhesive Layer

The thickness (a value measured in accordance with JIS K7130) of the pressure sensitive adhesive layer 13 may be preferably 1 to 50 μm, particularly preferably 3 to 15 μm, and further preferably 4 to 9 μm. When the thickness of the pressure sensitive adhesive layer 13 is 1 μm or more, the pressure sensitive adhesive sheet for batteries 1 can exhibit more excellent adhesive strength. When the thickness of the pressure sensitive adhesive layer 13 is 50 μm or less, the amount of electrolyte solution infiltrating into the pressure sensitive adhesive layer 13 from its end parts can be effectively reduced.

4. Release Sheet

The release sheet 14 is to protect the pressure sensitive adhesive layer until the use of the pressure sensitive adhesive sheet for batteries 1 and is removed when using the pressure sensitive adhesive sheet for batteries 1. In the pressure sensitive adhesive sheet for batteries 1 according to the present embodiment, the release sheet 14 may not necessarily be required.

Examples of the release sheet 14 to be used include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene-vinyl acetate film, ionomer resin film, ethylene-(meth)acrylic acid copolymer film, ethylene-(meth)acrylic ester copolymer film, polystyrene film, polycarbonate film, polyimide film, fluorine resin film, and liquid crystal polymer film. Crosslinked films thereof may also be used. A laminate film obtained by laminating a plurality of such films may also be used.

It may be preferred to perform release treatment for the release surface (surface to be in contact with the pressure sensitive adhesive layer 13) of the release sheet 14. Examples of a release agent to be used for the release treatment include alkyd-based, silicone-based, fluorine-based, unsaturated polyester-based, polyolefin-based, and wax-based release agents.

The thickness of the release sheet 14 is not particularly restricted, but may ordinarily be about 20 to 150 μm.

5. Physical Properties Etc. Of Pressure Sensitive Adhesive Sheet for Batteries

The adhesive strength (adhesive strength before immersion in electrolyte solvent) of the pressure sensitive adhesive sheet for batteries 1 according to the present embodiment to an aluminum plate may be preferably 0.5 N/25 mm or more, more preferably 0.75 N/25 mm or more, particularly preferably 1.0 N/25 mm or more, and further preferably 2.0 N/25 mm or more as the lower limit. When the lower limit of the adhesive strength of the pressure sensitive adhesive sheet for batteries 1 before immersion in the electrolyte solvent satisfies the above, a trouble is less likely to occur that the pressure sensitive adhesive sheet for batteries 1 delaminates from an adherend (in particular, a metal member) before the pressure sensitive adhesive sheet for batteries 1 comes into contact with the electrolyte solution. The upper limit of the above adhesive strength before immersion in the electrolyte solvent is not particularly limited, but may be preferably 50 N/25 mm or less in general, more preferably 40 N/25 mm or less in general, particularly preferably 30 N/25 mm or less, and further preferably 10 N/25 mm or less. As used in the present description, the adhesive strength refers basically to a peel strength that is measured using a method of 180° peeling in accordance with JIS Z0237: 2009. Details of the method of measurement are as described in the exemplary test, which will be described later.

After the pressure sensitive adhesive sheet for batteries 1 according to the present embodiment is attached to an aluminum plate and immersed in a solvent of a nonaqueous electrolyte solution at 80° C. for 72 hours, the adhesive strength (adhesive strength after immersion in electrolyte solvent) of the pressure sensitive adhesive sheet for batteries 1 to the aluminum plate may be preferably 0.5 N/25 mm or more, more preferably 0.75 N/25 mm or more, particularly preferably 1.0 N/25 mm or more, and further preferably 2.0 N/25 mm or more as the lower limit. When the lower limit of the adhesive strength of the pressure sensitive adhesive sheet for batteries 1 after immersion in the electrolyte solvent satisfies the above, a trouble is less likely to occur that the pressure sensitive adhesive sheet for batteries 1 delaminates from an adherend (in particular, a metal member) even after the pressure sensitive adhesive sheet for batteries 1 is in contact with the electrolyte solution (immersed in the electrolyte solution). The upper limit of the above adhesive strength after immersion in the electrolyte solvent is not particularly limited, but may be preferably 40 N/25 mm or less in general, more preferably 30 N/25 mm or less, particularly preferably 20 N/25 mm or less, and further preferably 10 N/25 mm or less. The pressure sensitive adhesive sheet for batteries 1 according to the present embodiment has the pressure sensitive adhesive layer 13 formed using the pressure sensitive adhesive composition P which contains the previously-described (meth)acrylic ester polymer (A) and may preferably further contain the metal chelate-based crosslinker (B) and particularly preferably further contain the silane coupling agent (C), and excellent adhesive strength within the above range can thereby be achieved. The solvent of a nonaqueous electrolyte solution as used herein is a prepared liquid obtained by mixing ethylene carbonate and diethyl carbonate at a volume ratio of 1:1.

The adhesive strength after immersion in the electrolyte solvent may be preferably 50% or more, more preferably 60% or more, particularly preferably 70% or more, and further preferably 100% or more with respect to the adhesive strength before immersion in the electrolyte solvent.

The thickness of the pressure sensitive adhesive sheet for batteries 1 (excluding the thickness of the release sheet 14) may be preferably 10 to 250 μm, particularly preferably 15 to 110 μm, and further preferably 20 to 45 μm. When the thickness of the pressure sensitive adhesive sheet for batteries 1 falls within the above range, the pressure sensitive adhesive sheet for batteries 1 can be more suitable in which both the adhesive strength and the heat resistance are excellent.

6. Production Method for Pressure Sensitive Adhesive Sheet for Batteries

The pressure sensitive adhesive sheet for batteries 1 according to the present embodiment can be produced, for example, through preparing a laminate of the base material 11 and the hard coat layer 12, preparing a laminate of a coating film of the pressure sensitive adhesive composition P and the release sheet 14, attaching these laminates to each other so that the hard coat layer 12 comes to contact with the coating film of the pressure sensitive adhesive composition P, then aging them, and forming the pressure sensitive adhesive layer 13 from the coating film of the pressure sensitive adhesive composition P. From the viewpoint of enhancing the interfacial adhesion between the hard coat layer 12 and the pressure sensitive adhesive layer 13, it may be preferred to perform surface treatment such as corona treatment and plasma treatment for a surface to be attached of any one of these layers or surfaces to be attached of both of these layers and then attach these layers to each other.

The laminate of the base material 11 and the hard coat layer 12 can be prepared, for example, in the following manner. First, one main surface of the base material 11 may be coated with a coating liquid that contains the composition for hard coat layer and may further contain a solvent if desired, and the coating liquid may be dried. The method of coating with the coating liquid may be performed using an ordinary method, such as a bar coating method, knife coating method, Meyer bar method, roll coating method, blade coating method, die coating method, and gravure coating method. Drying can be performed, for example, by heating at 80° C. to 150° C. for about 30 seconds to 5 minutes.

Thereafter, the layer obtained by drying the above coating liquid may be irradiated with active energy rays to cure the layer to form the hard coat layer 12. As the active energy rays, for example, electromagnetic wave or charged particle radiation having an energy quantum can be used and, specifically, ultraviolet rays, electron rays or the like can be used. In particular, ultraviolet rays may be preferred because of easy management. Irradiation with ultraviolet rays can be performed using a high pressure mercury lamp, xenon lamp or the like, and the irradiance level of ultraviolet rays may be preferably about 50 to 1,000 mW/cm$^2$ as the illuminance. The light amount may be preferably 50 to 10,000 mJ/cm$^2$, more preferably 80 to 5,000 mJ/cm$^2$, and particularly preferably 200 to 2,000 mJ/cm$^2$. On the other hand, irradiation with electron rays can be performed using an electron ray accelerator or the like, and the irradiance level of electron rays may be preferably about 10 to 1,000 krad.

The laminate of the coating film of the pressure sensitive adhesive composition P and the release sheet 14 can be prepared, for example, in the following manner. The release surface of the release sheet 14 may be coated with a coating liquid that contains the previously-described pressure sensitive adhesive composition P and may further contain a solvent if desired, and heating treatment may be performed to form the coating film.

Drying treatment when volatilizing a diluent solvent and the like of the coating liquid can also serve as the above heating treatment. When performing the heating treatment, the heating temperature may be preferably 50° C. to 150° C. and particularly preferably 70° C. to 120° C. The heating time may be preferably 30 seconds to 10 minutes and particularly preferably 50 seconds to 2 minutes.

After the hard coat layer 12 on the base material 11 and the coating film of the pressure sensitive adhesive composition P on the release sheet 14 are attached to each other, aging may be performed. This aging may ordinarily be performed at a room temperature (e.g. 23° C., 50% RH) for about 1 to 2 weeks. This allows the coating film of the pressure sensitive adhesive composition P to become the pressure sensitive adhesive layer 13, and the pressure sensitive adhesive sheet for batteries 1 is thus produced.

Another production method for the pressure sensitive adhesive sheet for batteries 1 according to the present embodiment may include forming the hard coat layer 12 and the pressure sensitive adhesive layer 13 in this order on the base material 11.

<Lithium-Ion Battery>

A lithium-ion battery according to an embodiment of the present invention may be configured such that two or more conductors are fixed in a state in which the two or more conductors are in contact with each other in the battery using the previously-described pressure sensitive adhesive sheet for batteries. It may be preferred that at least one of the two or more conductors be in a sheet-like shape while at least another one be in a line-like or a tape-like shape. A lithium-ion battery according to a preferred embodiment will be described below.

Figure 2:
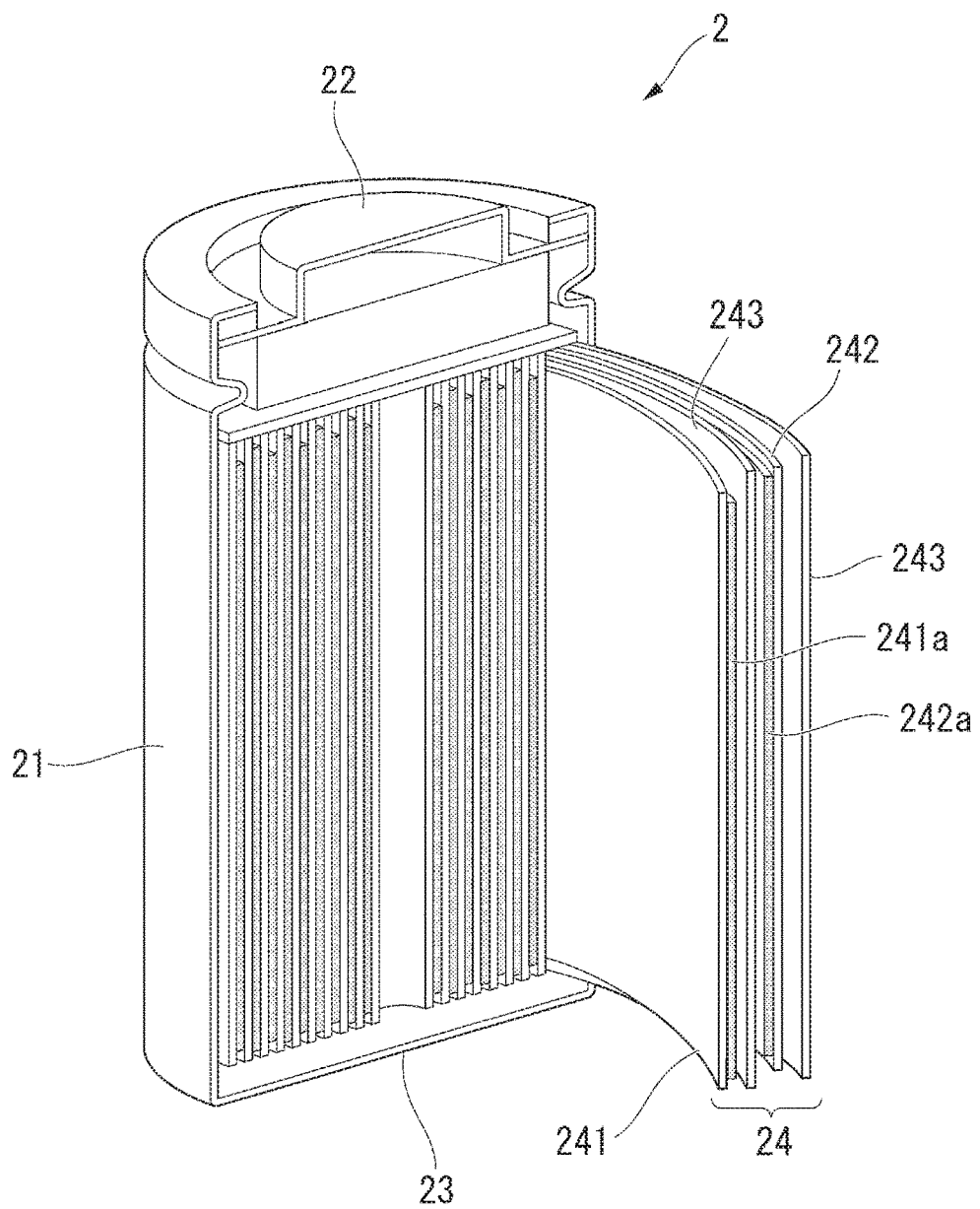
FIG. 2 is a partially cross-sectional, exploded perspective view of a lithium-ion battery according to an embodiment of the present invention.

As illustrated in FIG. 2, the lithium-ion battery 2 according to the present embodiment may comprise a bottomed cylindrical exterior body 21 of which the bottom part constitutes a negative electrode terminal 23, a positive electrode terminal 22 provided at an opening part of the exterior body 21, and an electrode body 24 provided inside the exterior body 21. An electrolyte solution may be enclosed in the lithium-ion battery 2.

The electrode body 24 may comprise a positive electrode collector 241 laminated with a positive electrode active material layer 241a, a negative electrode collector 242 laminated with a negative electrode active material layer 242a, and a separator 243 interposed therebetween. Each of them is in a sheet-like (belt-like) shape. The laminate of the positive electrode collector 241 and the positive electrode active material layer 241a may be referred to as a positive electrode while the laminate of the negative electrode collector 242 and the negative electrode active material layer 242a may be referred to as a negative electrode, and the positive electrode and the negative electrode may be collectively referred to as an electrode or electrodes. The positive electrode, the negative electrode, and the separator 243 may be wound up together and then inserted inside the exterior body 21.

Figure 3:
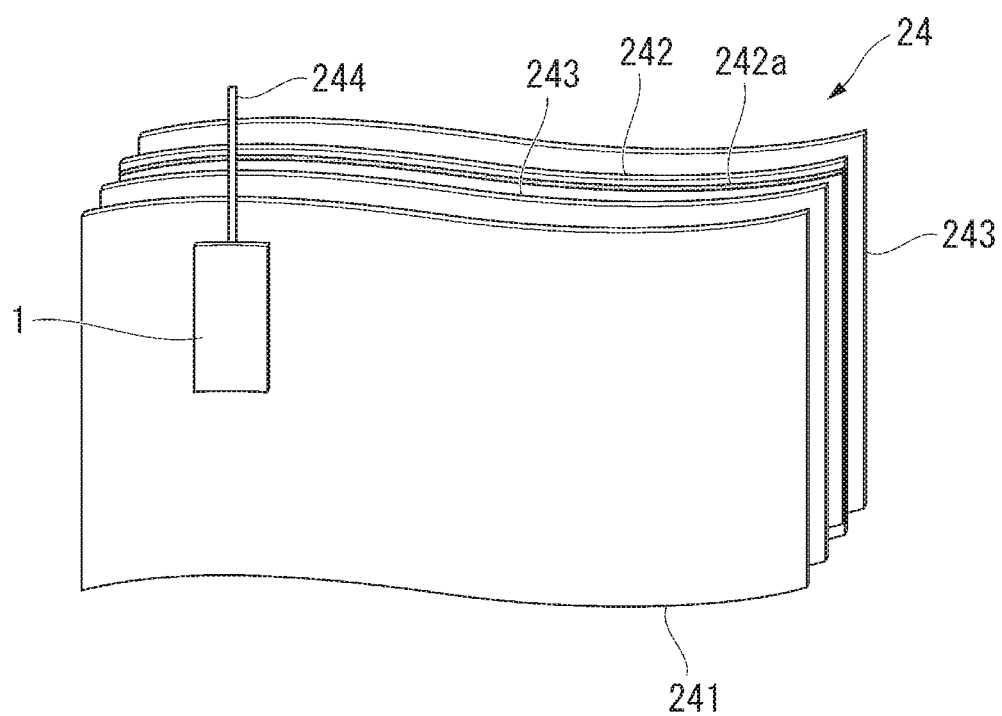
FIG. 3 is a developed, perspective view of an electrode body of the lithium-ion battery according to an embodiment of the present invention.

As illustrated in FIG. 3, a line-like or tape-like electrode lead-out tab 244 may be attached to the positive electrode collector 241 using the previously-described pressure sensitive adhesive sheet for batteries 1, and the electrode lead-out tab 244 can thereby be electrically connected to the positive electrode collector 241. The electrode lead-out tab 244 may be electrically connected also to the above positive electrode terminal 22. The negative electrode collector 242 may be electrically connected to the negative electrode terminal 23 via an electrode lead-out tab which is not illustrated.

In general, the positive electrode collector 241 and the negative electrode collector 242 may be made of a material of metal such as aluminum while the electrode lead-out tab 244 may be made of a material of metal such as aluminum and copper.

The electrolyte solution used in the lithium-ion battery 2 may ordinarily be a nonaqueous electrolyte solution. Preferred examples of the nonaqueous electrolyte solution include those in which a lithium salt as the electrolyte is dissolved in a mixed solvent of a cyclic carbonate and a lower chain carbonate. Examples of the lithium salt to be used include fluorine-based complex salts, such as lithium hexafluorophosphate ($LiPF_6$) and lithium borofluoride ($LiBF_4$), and $LiN(SO_2Rf)_2.LiC(SO_2Rf)_3$ (where $Rf=CF_3$, $C_2F_5$). Examples of the cyclic carbonate to be used include ethylene carbonate and propylene carbonate. Preferred examples of the lower chain carbonate include dimethyl carbonate, ethyl methyl carbonate, and diethyl carbonate.

The lithium-ion battery 2 according to the present embodiment can be manufactured by an ordinary method except that the previously-described pressure sensitive adhesive sheet for batteries 1 is used for fixation of the electrode lead-out tab 244.

In the lithium-ion battery 2 according to the present embodiment, the electrode lead-out tab 244 is attached to the positive electrode collector 241 using the pressure sensitive adhesive sheet for batteries 1. Even in a state in which the pressure sensitive adhesive sheet for batteries 1 is immersed in a nonaqueous electrolyte solution, cohesive failure of the pressure sensitive adhesive layer 13 due to its swelling is suppressed and the pressure sensitive adhesive sheet for batteries 1 exhibits excellent adhesive strength to the positive electrode collector 241 and the electrode lead-out tab 244. Moreover, the pressure sensitive adhesive which constitutes the pressure sensitive adhesive layer 13 is less likely to dissolve into the electrolyte solution and does not negatively affect the battery performance.

Moreover, the above pressure sensitive adhesive sheet for batteries 1 may be provided with the hard coat layer 12 and the insulation can therefore be ensured even if the base material 11 and/or the pressure sensitive adhesive layer 13 are carbonized.

As will be understood from the above, the lithium-ion battery 2 according to the present embodiment, in which the performance degradation, erroneous operation, thermal runaway, and short circuit due to the pressure sensitive adhesive sheet for batteries 1 can be suppressed, is expected to have excellent temperature stability and safety even under large-current conditions.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the pressure sensitive adhesive sheet for batteries 1, the hard coat layer 12 and/or the release sheet 14 may be omitted. In an embodiment, the pressure sensitive adhesive sheet for batteries 1 may be provided with one or more other layers between the base material 11 and the hard coat layer 12.

EXAMPLES

Hereinafter, the present invention will be described further specifically with reference to examples, etc., but the scope of the present invention is not limited to these examples, etc.

Example 1

1. Formation of Hard Coat Layer on Base Material

A coating liquid for hard coat layer was prepared through mixing 40 mass parts of dipentaerythritol hexaacrylate (a material of which the glass-transition point is not observed after curing) as an active energy ray-curable component, 5 mass parts of hydroxycyclohexyl phenyl ketone as a photopolymerization initiator, and 60 mass parts (solid content equivalent, here and hereinafter) of an organosilica sol (available from Nissan Chemical Industries, Ltd., trade name "MEK-ST," average particle diameter of 30 nm) as an inorganic filler and diluting them with methyl ethyl ketone.

One surface of a polyimide film (available from DU PONT-TORAY CO., LTD., trade name "Kapton 100H," thickness of 25 μm, flame retardation level V-0 according to the UL94 standard) as a base material was coated with the above coating liquid using a knife coater and the coating liquid was then dried at 70° C. for 1 minute. Subsequently, the coating film was irradiated with ultraviolet rays (illuminance of 230 $mW/cm^2$, light amount of 510 $mJ/cm^2$) to cure the coating film. A first laminate was thus obtained in which a hard coat layer having a thickness of 2 μm was formed on one surface of the base material.

A steel wool resistance test was conducted for the obtained first laminate such that the surface of the hard coat layer was rubbed at a load of 250 $g/cm^2$ using #0000 steel wool to reciprocate it ten times within a length of 10 cm. As a result, it was confirmed that no scratches due to the steel wool were formed on the surface of the hard coat layer.

2. Formation of Coating Film of Pressure Sensitive Adhesive Composition on Release Sheet A (meth)acrylic ester polymer (Tg: −50° C.) was prepared using a solution polymerization method to copolymerize 80 mass parts of 2-ethylhexyl acrylate, 15 mass parts of isobornyl acrylate, and 5 mass parts of acrylic acid. The molecular weight of this polymer was measured using gel permeation chromatography (GPC), which will be described later. The weight-average molecular weight (Mw) was 700,000.

Then, a coating liquid for pressure sensitive adhesive layer was prepared through mixing 100 mass parts of the obtained (meth)acrylic ester polymer, 1.55 mass parts of aluminum tris(acetylacetonate) (available from Soken Chemical & Engineering Co., Ltd., trade name "M-5A") as a metal chelate-based crosslinker, and 0.5 mass parts of 3-glycidoxypropylmethyldimethoxysilane (available from Shin-Etsu Chemical Co., Ltd., trade name "KBM-403") as a silane coupling agent and diluting them with methyl ethyl ketone.

A release sheet (available from LINTEC Corporation, trade name "PET251130") was prepared in which one surface of a polyethylene terephthalate film was subjected to release treatment using a silicone-based release agent. The release-treated surface of the release sheet was coated with the obtained coating liquid using a knife coater and the coating liquid was then heat-treated at 120° C. for 1 minute. A second laminate was thus obtained in which the coating film of the pressure sensitive adhesive composition was laminated on the release-treated surface of the release sheet.

3. Production of Pressure Sensitive Adhesive Sheet for Batteries

The surface of the first laminate, produced as the above, at the side of the hard coat layer and the surface of the second laminate, produced as the above, at the side of the coating film of the pressure sensitive adhesive composition were attached to each other and they were then aged at 23° C. and 50% RH for 7 days. A pressure sensitive adhesive sheet for batteries was thus obtained in which the coating film of the pressure sensitive adhesive composition became the pressure sensitive adhesive layer. The thickness of the pressure sensitive adhesive layer was 7 μm. The thickness of the pressure sensitive adhesive layer was calculated through obtaining the total thickness of the pressure sensitive adhesive sheet for batteries and subtracting the thicknesses of the first laminate and the above release sheet from the total thickness.

Example 2

A (meth)acrylic ester polymer (Tg: −44° C.) was prepared using a solution polymerization method to copolymerize 75 mass parts of 2-ethylhexyl acrylate, 20 mass parts of isobornyl acrylate, and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 3

A (meth)acrylic ester polymer (Tg: −38° C.) was prepared using a solution polymerization method to copolymerize 70 mass parts of 2-ethylhexyl acrylate, 25 mass parts of isobornyl acrylate, and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 4

A (meth)acrylic ester polymer (Tg: −58° C.) was prepared using a solution polymerization method to copolymerize 87.5 mass parts of 2-ethylhexyl acrylate, 7.5 mass parts of isobornyl acrylate, and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 5

A (meth)acrylic ester polymer (Tg: −49° C.) was prepared using a solution polymerization method to copolymerize 79 mass parts of 2-ethylhexyl acrylate, 20 mass parts of isobornyl acrylate, and 1 mass part of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 6

A (meth)acrylic ester polymer (Tg: −55° C.) was prepared using a solution polymerization method to copolymerize 80 mass parts of 2-ethylhexyl acrylate, 15 mass parts of cyclohexyl acrylate, and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 7

A (meth)acrylic ester polymer (Tg: −28° C.) was prepared using a solution polymerization method to copolymerize 80 mass parts of 2-ethylhexyl acrylate, 15 mass parts of n-dodecyl acrylate, and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Example 8

A (meth)acrylic ester polymer (Tg: −65° C.) was prepared using a solution polymerization method to copolymerize 95 mass parts of 2-ethylhexyl acrylate and 5 mass parts of acrylic acid. The molecular weight of this polymer was measured using gel permeation chromatography (GPC), which will be described later. The weight-average molecular weight (Mw) was 700,000. A pressure sensitive adhesive sheet for batteries was produced in the same manner as in Example 1 except that the (meth)acrylic ester polymer obtained as the above was used.

Comparative Example 1

A (meth)acrylic ester polymer (Tg: −38° C.) was prepared using a solution polymerization method to copolymerize 60 mass parts of 2-ethylhexyl acrylate, 20 mass parts of methyl methacrylate, and 20 mass parts of 2-hydroxyethyl acrylate. The molecular weight of this polymer was measured using gel permeation chromatography (GPC), which will be described later. The weight-average molecular weight (Mw) was 500,000.

Then, a coating liquid for pressure sensitive adhesive layer was prepared through mixing 100 mass parts of the obtained (meth)acrylic ester polymer, 0.93 mass parts of aluminum tris(acetylacetonate) (available from Soken Chemical & Engineering Co., Ltd., trade name "M-5A") as a metal chelate-based crosslinker, and 0.5 mass parts of 3-glycidoxypropylmethyldimethoxysilane (available from Shin-Etsu Chemical Co., Ltd., trade name "KBM-403") as a silane coupling agent and diluting them with methyl ethyl ketone. A pressure sensitive adhesive sheet for batteries was produced in the same manner as in Example 1 except that the coating liquid for pressure sensitive adhesive layer obtained as the above was used.

Comparative Example 2

A (meth)acrylic ester polymer (Tg: −40° C.) was prepared using a solution polymerization method to copolymerize 76.8 mass parts of n-butyl acrylate, 19.2 mass parts of methyl acrylate, and 4 mass parts of acrylic acid. The molecular weight of this polymer was measured using gel permeation chromatography (GPC), which will be described later. The weight-average molecular weight (Mw) was 1,000,000.

Then, a coating liquid for pressure sensitive adhesive layer was prepared through mixing 100 mass parts of the obtained (meth)acrylic ester polymer, 0.31 mass parts of aluminum tris(acetylacetonate) (available from Soken Chemical & Engineering Co., Ltd., trade name "M-5A") as a metal chelate-based crosslinker, 2.35 mass parts of trimethylolpropane-modified tolylene diisocyanate (available from TOYOCHEM CO., LTD., trade name "BHS8515") as an isocyanate-based crosslinker, and 0.5 mass parts of 3-glycidoxypropylmethyldimethoxysilane (available from Shin-Etsu Chemical Co., Ltd., trade name "KBM-403") as a silane coupling agent and diluting them with methyl ethyl ketone. A pressure sensitive adhesive sheet for batteries was produced in the same manner as in Example 1 except that the coating liquid for pressure sensitive adhesive layer obtained as the above was used.

Comparative Example 3

A (meth)acrylic ester polymer (Tg: −50° C.) was prepared using a solution polymerization method to copolymerize 96 mass parts of n-butyl acrylate and 4 mass parts of acrylic acid. The molecular weight of this polymer was measured using gel permeation chromatography (GPC), which will be described later. The weight-average molecular weight (Mw) was 1,000,000.

Then, a coating liquid for pressure sensitive adhesive layer was prepared through mixing 100 mass parts of the obtained (meth)acrylic ester polymer, 0.93 mass parts of aluminum tris(acetylacetonate) (available from Soken Chemical & Engineering Co., Ltd., trade name "M-5A") as a metal chelate-based crosslinker, and 0.5 mass parts of 3-glycidoxypropylmethyldimethoxysilane (available from Shin-Etsu Chemical Co., Ltd., trade name "KBM-403") as a silane coupling agent and diluting them with methyl ethyl ketone. A pressure sensitive adhesive sheet for batteries was produced in the same manner as in Example 1 except that the coating liquid for pressure sensitive adhesive layer obtained as the above was used.

Here, the previously-described weight-average molecular weight (Mw) refers to a weight-average molecular weight that is measured as a standard polystyrene equivalent value under the following condition using gel permeation chromatography (GPC) (GPC measurement).

<Measurement Condition>
GPC measurement apparatus: HLC-8020 available from Tosoh Corporation
GPC columns (passing in the order below): available from Tosoh Corporation
  TSK guard column HXL-H
  TSK gel GMHXL (×2)
  TSK gel G2000HXL
  Solvent for measurement: tetrahydrofuran
  Measurement temperature: 40° C.
<Exemplary Test 1>(Measurement of Gel Fraction by Immersion in Electrolyte Solvent)

In the production of the pressure sensitive adhesive sheet for batteries of each of Examples and Comparative Examples, the surface of the second laminate at the side of the coating film of the pressure sensitive adhesive composition was attached to the release-treated surface of another release sheet (available from LINTEC Corporation, trade name "PET251130") in which one surface of a polyethylene terephthalate film was subjected to release treatment using a silicone-based release agent. Thereafter, aging at 23° C. and 50% RH for 7 days was performed and a sheet for measurement was thus obtained comprising the pressure sensitive adhesive layer alone, of which both surfaces were protected by the release sheets.

The obtained sheet for measurement was cut into a size of 80 mm×80 mm and the release sheets protecting both surfaces of the pressure sensitive adhesive layer were removed. The pressure sensitive adhesive layer was wrapped with a polyester mesh (mesh size of 200) and the total mass was weighed using a precision balance. The mass of the pressure sensitive adhesive alone was calculated by subtracting the mass of the above mesh alone from the total mass. The calculated mass is represented by M1. Then, the pressure sensitive adhesive wrapped with the above polyester mesh was immersed in a prepared liquid as the electrolyte solvent at 80° C. for 72 hours. The prepared liquid was obtained by mixing ethylene carbonate and diethyl carbonate at a volume ratio of 1:1. Thereafter, the pressure sensitive adhesive layer was taken out and once immersed in ethanol to dissolve and remove the attached electrolyte solvent, air-dried for 24 hours under an environment of a temperature of 23° C. and a relative humidity of 50%, and further dried in an oven at 80° C. for 12 hours. After drying, the mass was weighed using a precision balance and the mass of the pressure sensitive adhesive alone was calculated by subtracting the mass of the above mesh alone. The calculated mass is represented by M2. The gel fraction (%) was calculated from the calculation formula of (M2/M1)×100. Results are listed in Table 1.
<Exemplary Test 2>(Measurement of Adhesive Strength Before Immersion in Electrolyte Solvent)

The adhesive strength of the pressure sensitive adhesive sheet for batteries in this exemplary test was measured in accordance with JIS Z0237: 2009 except the following operation.

The pressure sensitive adhesive sheet for batteries obtained in each of Examples and Comparative Examples was cut into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment of 23° C. and 50% RH. Immediately thereafter, the test piece was peeled off from the above aluminum plate at a peel angle of 180° and a peel speed of 300 mm/min using a universal tensile tester (available from ORIENTEC Co., LTD., trade name "TENSILON UTM-4-100") and the adhesive strength (N/25 mm) was thus measured. The measured value was employed as the adhesive strength before immersion in the electrolyte solvent. Results are listed in Table 1.
<Exemplary Test 3>(Measurement of Adhesive Strength after Immersion in Electrolyte Solvent)

The adhesive strength of the pressure sensitive adhesive sheet for batteries in this exemplary test was measured in accordance with JIS Z0237: 2009 except the following operation.

The pressure sensitive adhesive sheet for batteries obtained in each of Examples and Comparative Examples was cut into a width of 25 mm and a length of 250 mm and the release sheet was then removed to obtain a test piece. The exposed pressure sensitive adhesive layer of the test piece was attached to an aluminum plate as an adherend using a rubber roller of 2 kg under an environment of 23° C. and 50% RH and they were then left untouched under the same environment for 20 minutes. Thereafter, in a state in which the test piece was attached to the aluminum plate, they were immersed in a prepared liquid as the electrolyte solvent at 80° C. for 72 hours. The prepared liquid was obtained by mixing ethylene carbonate and diethyl carbonate at a volume ratio of 1:1. Immediately after the test piece and the aluminum plate were taken out from the prepared liquid, the adhesive strength (N/25 mm) was measured in the same manner as the above. The measured value was employed as the adhesive strength after immersion in the electrolyte solvent. Results are listed in Table 1.

During the above test, the cohesive failure of the pressure sensitive adhesive layers did not occur in the pressure sensitive adhesive sheets for batteries of Examples, but the cohesive failure of the pressure sensitive adhesive layers did occur in the pressure sensitive adhesive sheets for batteries of Comparative Examples.

<Exemplary Test 4>(Evaluation of Electrolyte Solution Resistance)

The release sheet was removed from the pressure sensitive adhesive sheet for batteries obtained in each of Examples and Comparative Examples, the exposed pressure sensitive adhesive layer was attached to an aluminum plate (thickness: 1 mm), and this was used as a test piece. The obtained test piece was enclosed in an aluminum laminated bag together with a prepared liquid as an electrolyte solution obtained through mixing ethylene carbonate and diethyl carbonate at a volume ratio of 1:1 to make a mixture liquid and dissolving lithium hexafluorophosphate ($LiPF_6$) in the mixture liquid at a concentration of 1 mol/L, and they were heated under an environment of 80° C. for 3 days. Thereafter, the pressure sensitive adhesive sheet for batteries was peeled off from the aluminum plate using tweezers. Confirmation was made for the state of the pressure sensitive adhesive sheet for batteries when immersed in the electrolyte solution, the adhesive strength when peeling off the pressure sensitive adhesive sheet for batteries, and the state when peeling off the pressure sensitive adhesive sheet for batteries and the electrolyte solution resistance was evaluated on the basis of the determination criteria as below. Evaluation of "3" or higher is acceptable. Results are listed in Table 1.

5 . . . Delamination occurred at the interface between the pressure sensitive adhesive and the adherend (high adhesive strength).

4 . . . Delamination occurred at the interface between the pressure sensitive adhesive and the adherend (middle adhesive strength).

3 . . . Delamination occurred at the interface between the pressure sensitive adhesive and the adherend (low adhesive strength).

2 . . . Cohesive failure of the pressure sensitive adhesive occurred due to its swelling.

1 . . . Delamination occurred during immersion in the electrolyte solution.

TABLE 1

|  | Gel fraction (%) after immersion in electrolyte solvent | Adhesive strength (N/25 mm) before immersion in electrolyte solvent | Adhesive strength (N/25 mm) after immersion in electrolyte solvent | Evaluation of electrolyte solution resistance |
|---|---|---|---|---|
| Example 1 | 94.2 | 2.2 | 2.5 | 5 |
| Example 2 | 95.6 | 2.3 | 2.5 | 5 |
| Example 3 | 93.2 | 2.7 | 2.8 | 4 |
| Example 4 | 92.3 | 1.9 | 1.6 | 3 |
| Example 5 | 91.5 | 1.2 | 3.4 | 3 |
| Example 6 | 92.5 | 2.3 | 1.8 | 4 |
| Example 7 | 93.6 | 1.5 | 1.7 | 3 |
| Example 8 | 92.7 | 1.6 | 1.5 | 3 |
| Comparative Example 1 | 53.5 | 2.2 | 1.0 | 1 |
| Comparative Example 2 | 72.1 | 3.0 | 1.5 | 1 |
| Comparative Example 3 | 84.1 | 2.5 | 2.3 | 2 |

As apparent from Table 1, the pressure sensitive adhesive sheets for batteries of Examples do not cause cohesive failure of the pressure sensitive adhesive layers and exhibit high adhesive strength (70% or more of adhesive strength before immersion in electrolyte solvent) even when immersed in the electrolyte solvent and electrolyte solution. It has also been found that the pressure sensitive adhesives of the pressure sensitive adhesive sheets for batteries of Examples exhibit a high gel fraction even after immersion in the electrolyte solvent and are less likely to dissolve into the electrolyte solvent.

INDUSTRIAL APPLICABILITY

The pressure sensitive adhesive composition and the pressure sensitive adhesive sheet for batteries according to the present invention are suitable for attaching an electrode lead-out tab to an electrode (current collector) inside a lithium-ion battery.

DESCRIPTION OF REFERENCE NUMERALS

1 . . . Pressure sensitive adhesive sheet for batteries
   11 . . . Base material
   12 . . . Hard coat layer
   13 . . . Pressure sensitive adhesive layer
   14 . . . Release sheet
2 . . . Lithium-ion battery
   21 . . . Exterior body
   22 . . . Positive electrode terminal
   23 . . . Negative electrode terminal
   24 . . . Electrode body
      241 . . . Positive electrode collector
      241a . . . Positive electrode active material layer
      242 . . . Negative electrode collector
      242a . . . Negative electrode active material layer
      243 . . . Separator
      244 . . . Electrode lead-out tab

The invention claimed is:

1. A battery comprising a pressure sensitive adhesive sheet and an electrolyte solution, wherein:
the pressure sensitive adhesive sheet is provided at a site in the battery in which there is a possibility of contact with the electrolyte solution;
the pressure sensitive adhesive sheet comprises a base material and a pressure sensitive adhesive layer laminated on one side of the base material; and
the pressure sensitive adhesive layer is formed of a pressure sensitive adhesive composition comprising:

a (meth)acrylic ester polymer having a main chain containing (meth)acrylic alkyl ester monomer units having a carbon number of an alkyl group of 6 or more and 20 or less, carboxy group-containing monomer units, and 5 to 35 mass % of alicyclic structure-containing monomer units, wherein the (meth)acrylic ester polymer has a glass-transition temperature of lower than 0° C.

2. The battery as recited in claim 1., wherein the pressure sensitive adhesive composition further comprises a metal chelate-based crosslinker in an amount of 0.1 to 5.0 mass parts per 100 mass parts of the (meth)acrylic ester polymer.

3. The battery as recited in claim 1, wherein the pressure sensitive adhesive layer has a gel fraction of 70% or more and 100% or less measured by immersing the pressure sensitive adhesive layer in a mixed solvent of ethylene carbonate and diethyl carbonate at a volume ratio of 1:1 at 80° C. for 72 hours.

4. The battery as recited in claim 1, wherein the base material is a film formed of a polymer having a nitrogen-containing ring structure at a main chain.

5. The battery as recited in claim 1, wherein a surface of the one side of the base material on which the pressure sensitive adhesive layer is formed with a hard coat layer; wherein a surface of the hard coat layer is scratch free after ten reciprocated rubbings of a 10 cm length portion of the surface at a load of 250 g/cm$^2$ using #0000 steel wool.

6. The battery as recited in claim 1, wherein two or more conductors are fixed in a state in which the two or more conductors are in contact with each other in the battery using the pressure sensitive adhesive sheet.

7. The battery as recited in claim 1, wherein the battery is a lithium-ion battery.

8. A method of manufacturing a battery, comprising:
preparing a pressure sensitive adhesive sheet comprising a base material and a pressure sensitive adhesive layer laminated on one side of the base material; and
fixing two or more conductors in a state in which the two or more conductors are in contact with each other in the battery using the pressure sensitive adhesive sheet, wherein the pressure sensitive adhesive layer is formed of a pressure sensitive adhesive composition comprising:
a (eth)acrylic ester polymer having a main chain containing (meth)acrylic alkyl ester monomer units having a carbon number of an alkyl group of 6 or more and 20 or less, carboxy group-containing monomer units, and 5 to 35 mass % of alicyclic structure-containing monomer units
wherein the (meth)acrylic ester polymer has a glass-transition temperature of lower than 0° C.

9. A battery comprising a pressure sensitive adhesive sheet and an electrolyte solution, wherein:
the pressure sensitive adhesive sheet is provided at a site in the battery in which there is a possibility of contact with the electrolyte solution:
the pressure sensitive adhesive sheet comprises a base material and a pressure sensitive adhesive layer laminated on one side of the base material; and
the pressure sensitive adhesive layer is formed of a pressure sensitive adhesive composition comprising,
a (meth)acrylic ester polymer containing, as monomer units that constitute the meth)acrylic ester polymer, a (meth)acrylic alkyl ester monomer unit having a carbon number of an alkyl group of 6 or more and 20 or less, a carboxy group-containing monomer unit and an alicyclic structure-containing monomer unit, wherein
the (meth)acrylic ester polymer has a glass-transition temperature of lower than 0° C. and
the pressure sensitive adhesive composition comprises a silage coupling agent in an amount of 0.01 to 5.0 mass parts to 100 mass parts of the (meth)acrylic ester polymer.

* * * * *